(12) United States Patent
DeCesaris et al.

(10) Patent No.: US 9,811,660 B2
(45) Date of Patent: Nov. 7, 2017

(54) SECURING A SHARED SERIAL BUS

(71) Applicant: Lenovo Enterprise Solutions (Singapore) Pte. Ltd., Singapore (SG)

(72) Inventors: Michael DeCesaris, Carrboro, NC (US); Jeffery M. Franke, Apex, NC (US); John K. Whetzel, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 604 days.

(21) Appl. No.: 14/305,015

(22) Filed: Jun. 16, 2014

(65) Prior Publication Data

US 2015/0363596 A1    Dec. 17, 2015

(51) Int. Cl.
*G06F 21/55*    (2013.01)
*G06F 13/42*    (2006.01)

(52) U.S. Cl.
CPC ........ *G06F 21/554* (2013.01); *G06F 13/4282* (2013.01); *G06F 2221/034* (2013.01)

(58) Field of Classification Search
None
See application file for complete search history.

(56) References Cited

U.S. PATENT DOCUMENTS

| | | |
|---|---|---|
| 4,486,855 A | 12/1984 | Duke |
| 8,397,276 B2 | 3/2013 | March et al. |
| 2011/0126194 A1 | 5/2011 | Huynh et al. |
| 2012/0240234 A1 | 9/2012 | Lomont et al. |
| 2013/0086636 A1 | 4/2013 | Golovanov |
| 2013/0329732 A1* | 12/2013 | Vyas ..................... H04L 45/745 370/392 |
| 2015/0230091 A1* | 8/2015 | Sahu ...................... H04L 43/18 455/410 |

OTHER PUBLICATIONS

"MAC filtering-Wikipedia, the free encyclopedia" [online][retrieved on Nov. 20, 2013]. <http://en.wikipedia.org/wiki/MAC_filtering>.
"MAC spoofing-Wikipedia, the free encyclopedia" [online][retrieved on Nov. 20, 2013]. <http://en.wikipedia.org/wiki/MAC_spoofing>.

* cited by examiner

*Primary Examiner* — Idriss N Alrobaye
*Assistant Examiner* — Dayton Lewis-Taylor
(74) *Attorney, Agent, or Firm* — Jeffrey L. Streets

(57) ABSTRACT

A method for securing a serial bus shared by a control module and one or more subordinate electronic devices, the serial bus having a protocol specifying that messages on the serial bus have a source address and a destination address. The method comprises examining, by one or more processors of the control module, each message appearing on the serial bus that was not originated by the control module; identifying, by one or more processors of the control module, a suspect message that satisfies one or more suspect message criteria. The method includes updating, by one or more processors of the control module, an event metric, and testing to determine whether a threshold has been exceeded; and in the event the threshold has not been exceeded, initiating, by one or more processors of the control module, a co-transmission sufficient to disrupt consumption of the suspect message by a subordinate device.

14 Claims, 5 Drawing Sheets

SECURING A SHARED SERIAL BUS

FIELD OF THE INVENTION

The present invention relates generally to systems that share a common serial bus and in particular to ensuring that the shared serial bus has minimal security vulnerabilities.

BACKGROUND OF THE INVENTION

The use of server computers has proliferated in recent years. One reason for server growth is that networks of desktop computers have largely taken over the computing tasks once reserved for mainframe systems. Since storage capacity of a desktop machine is often limited, files that are frequently used are often stored on remote server computers that allow multiple users ready access. In an enterprise environment, where large volumes of files must frequently be stored in such a way that fast, accurate reads and writes are readily supported, a large number of servers may be needed.

Servers are also the mainstay of data warehousing implementations, where analysis of large databases creates additional data that must be stored. Servers are widely used in data archiving applications, as well as in data replication and recovery. Organizations that support popular websites often employ multiple servers to support large numbers of users, and Internet Service Providers (ISPs) use multiple servers to support connections to multiple subscribers.

There are many instances in modern computing in which large numbers of servers perform the same or similar functions, and these servers are often co-located in order to simplify environmental control, more easily satisfy power requirements, and provide proper physical security for server installations. In order to monitor operation of large numbers of servers, the servers often share a common communication bus structure that supports status reporting and control functionality.

SUMMARY

Embodiments of the present invention disclose a computer-implemented method, computer program product, and system for securing a serial bus shared by a control module and one or more subordinate electronic devices, the serial bus having a protocol specifying that messages on the serial bus have a source address and a destination address. The method comprises examining, by one or more processors of the control module, each message appearing on the serial bus that was not originated by the control module; identifying, by one or more processors of the control module, a suspect message that satisfies one or more suspect message criteria, the suspect message criteria consisting of: the source address of the message is the source address of the control module, the destination address of the message is an address other than the destination address of the control module, and the message includes one or more invalid fields. The method includes updating, by one or more processors of the control module, an event metric, and testing to determine whether a threshold has been exceeded; and in the event the threshold has not been exceeded, initiating, by one or more processors of the control module, a co-transmission sufficient to disrupt consumption of the suspect message by a subordinate device.

DETAILED DESCRIPTION

On systems that share a common serial bus, there is an ongoing security concern with the vulnerability of that infrastructure to both covert channel and denial of service attacks. Government entities and defense contractors look with particular concern at any physical interfaces that are shared among computing elements. They view these paths as having potential exposure to attacks from other systems that share the interfaces.

Large server computer installations often feature a shared serial bus structure for monitoring, communication, and control purposes. Serial communication protocols having message structures that include sender and recipient addresses may be particularly vulnerable to a form of attack known as "spoofing." The term "spoofing" in the computer network art generally refers to a situation in which one device or entity attempts to disguise itself as another device or entity. Spoofing in the e-mail context receives a fair amount of publicity, largely because misappropriation of sensitive personal information is often the objective of spoofing attacks of this type.

One approach to minimizing security vulnerabilities for a shared serial bus structure is to provide a bus control and management device that can take advantage of the characteristics of the serial bus in order to monitor communications on the bus and take steps to intervene if unauthorized forms of communication are encountered. As noted previously, one or more embodiments of the serial bus protocol under consideration herein contemplates the use of sender and recipient fields within the message structure. Devices connected to the bus would thus be responsible for encoding the source and destination of the messages or packets they send on the shared bus. Each participant on the bus scans the destination field of every message to determine if it is addressed to them. If so, the message is consumed. In this context, to consume a packet or message means to read, interpret, and react appropriately to the message. In order to enforce communication channels on the bus, embodiments in accordance with the present invention extend this communication mechanism further, and add an enforcement role to one device on the bus designated as the master.

In an illustrative embodiment, a control module that carries out administrative functions may reside in the chassis of one of the server computers. This control module has the capability to assert specially designated lines that allow it to "degate" a device from the bus, where the term "degate" means to isolate or disconnect. In essence, the control module may disconnect an unruly server computer from the bus by asserting lines that isolate at least that server computer's transmit line from the shared bus. This mechanism may be employed to enforce the communication channel.

Figure 1:
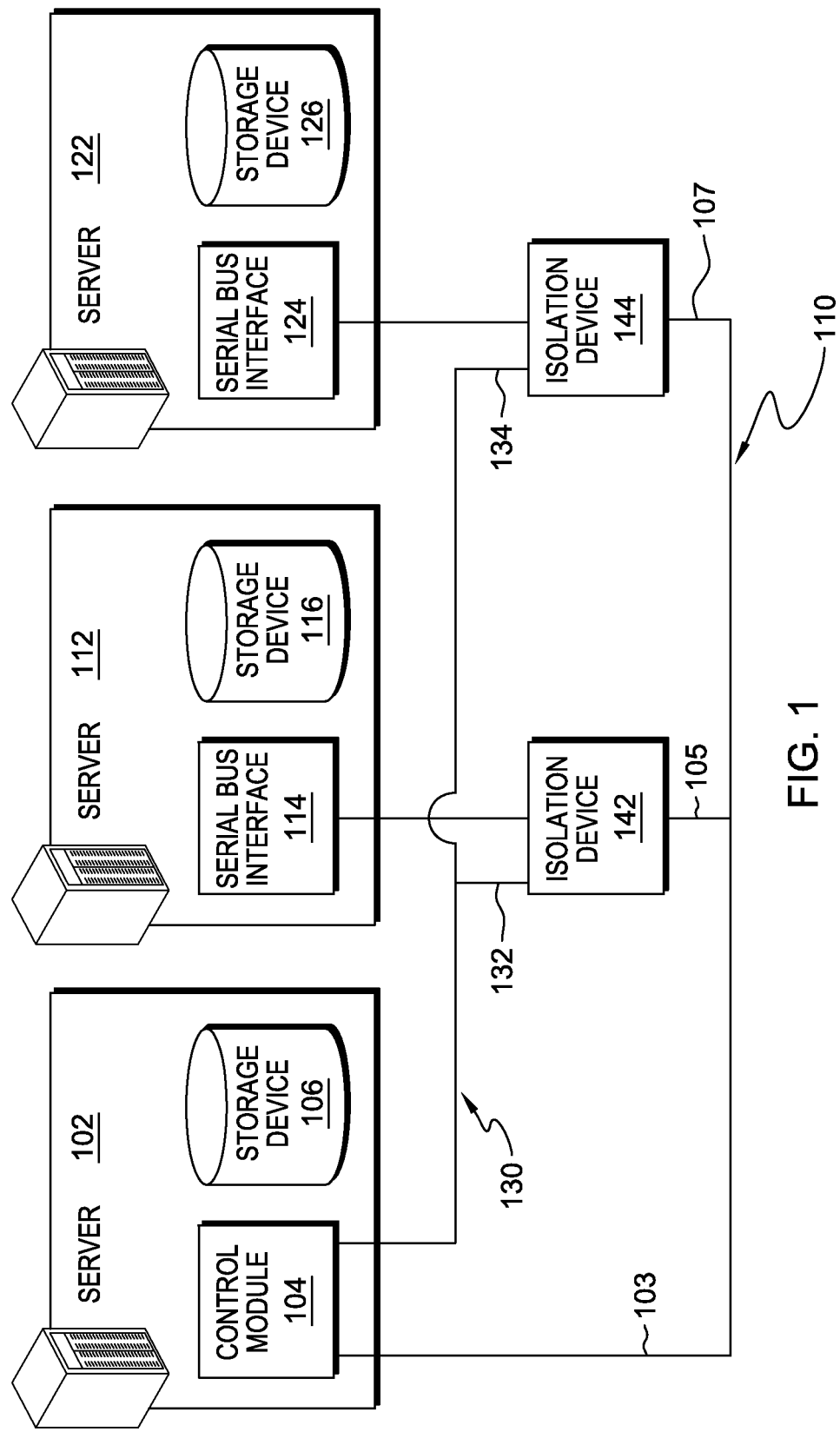
FIG. 1 is a block diagram illustrating interconnection of a plurality of server computers in an embodiment in accordance with the present invention.

Example embodiments in accordance with the present invention will now be described in detail with reference to the Figures. FIG. 1 is a block diagram illustrating interconnection of a plurality of server computers in an embodiment in accordance with the present invention. Server computers 102, 112, and 122 share a serial bus 110. In practice, there may be a relatively large number of server computers, such as server computer 122, that are concurrently connected to serial bus 110, but only three server computers 102, 112, 122 are shown in FIG. 1 for the sake of clarity.

Serial bus 110 may, for example, but without limitation, be implemented using the RS-485 standard to facilitate communication between control module 104 and serial bus interfaces 114, 124 in server computers 112 and 122, respectively. Serial bus 110 may be a multidrop bus shared by all of the computer servers 102, 112, 122 simultaneously, as evidenced by connections 103, 105 and 107 that provide a connection to the serial bus 110 for computer servers 102, 112 and 122, respectively. In an illustrative embodiment, negotiation mechanisms are used to compete for access to the bus 110 and resolve collisions; however, in other embodiments, collision detection and avoidance may not be rigorously practiced. Serial bus 110 may incorporate other signals besides transmit data and receive data. Data in each direction may be clocked, for example, by a transmit clock signal and a receive clock signal. It is also possible that transmit data and receive data may be implemented as balanced lines, for purposes of increased noise immunity. In such a case, there may be two lines for transmit data (TX+ and TX−), as well as two lines for receive data (RX+ and RX−). It is also possible, of course, that transmit data and receive data may not require a clock signal. Such an architecture may be easily implemented, for example, without limitation, by utilizing Manchester-encoded data so that a clock signal may be readily recovered from the data signals.

Control module 104 has the capability to degate or isolate individual server computers 114, 124 from the serial bus 110 through assertion of control lines 130. For example, in the illustrated embodiment of FIG. 1, individual control line 132 is coupled to isolation device 142, which may be an analog switch, for example, that may simply be turned off in response to a proper signal over control line 132, thus interrupting the transmit data line of server computer 112 and isolating server computer 112 from serial bus 110. Similarly, control line 134 may be utilized to isolate server computer 122 through the action of isolation device 144. Of course, in the event that balanced lines are employed for serial data transmission, both TX+ and TX− must be interrupted to isolate a particular server computer.

Although server computers are illustrated as the interconnected electronic devices in embodiments described in conjunction with FIG. 1, a network of server computers is not the only configuration that may benefit from a method of securing a serial bus structure as described herein. Serially interconnected electronic devices in the form of a control system dedicated to environmental management of an office building or other structure (heating, ventilation, and air conditioning, or HVAC, for example) may have a need to deal with security vulnerabilities. The same may be said, for example, without limitation, for serially interconnected electronic devices forming a security system, or a control network for a manufacturing facility or power plant that relies upon a serial bus for the exchange of status reporting messages, data communication, and control.

Figure 2:
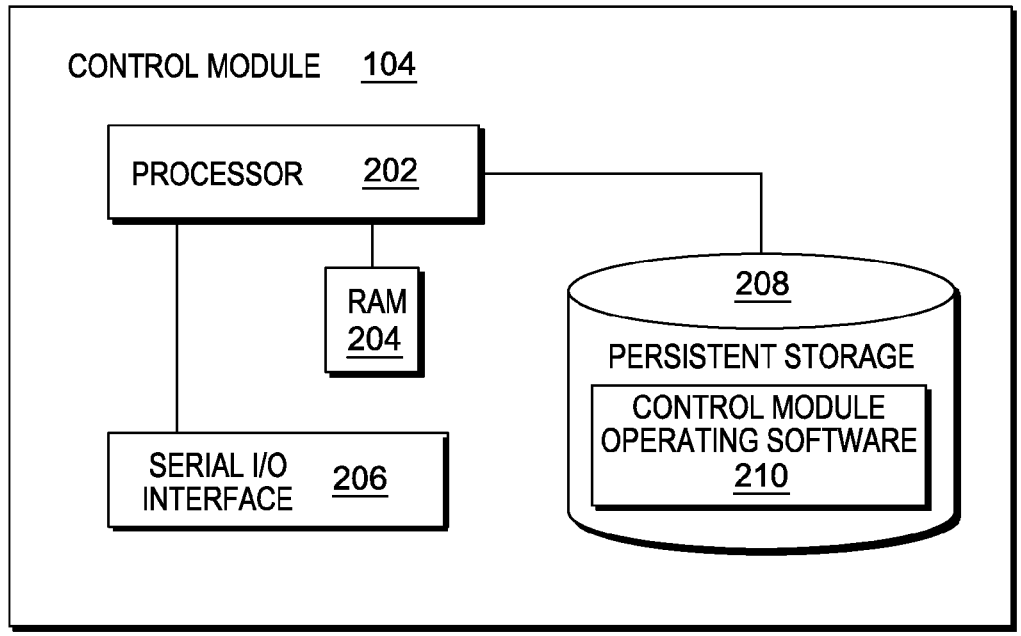
FIG. 2 is a block diagram of the control module of FIG. 1.

FIG. 2 is a block diagram of control module 104 of FIG. 1. The control module 104 includes a processor 202 that communicates with random access memory (RAM) 204 as well as persistent storage 208 in which control module operating software 210 resides. Control module operating software 210 may be in the form of firmware, for example, and stored in a ROM (read only memory) or flash memory device. The processor 202 also communicates with a serial input/output (I/O) interface 206 that is electrically connected to serial bus 110 (FIG. 1). Serial I/O interface 206 may also provide hardware to support isolation device control signals 130, shown in FIG. 1, which may be manipulated by processor 202.

Although control module 104 is shown residing within server 102, this configuration is intended merely as an example, and is not intended to be limiting. The device that controls and monitors serial communication over serial bus 110 may also be, for example, without limitation, a stand-alone device, such as a desktop computer, a laptop computer, a tablet computer, a smartphone, or any other computer system known in the art, so long as the stand-alone device is capable of executing computer instructions and supporting an appropriate interface to monitor and control serial bus 110.

Figure 3:
FIG. 3 illustrates message format for messages transmitted over a serial bus in an embodiment in accordance with the present invention.

FIG. 3 illustrates message format for messages transmitted over a serial bus (such as serial bus 110 in FIG. 1) in an embodiment in accordance with the present invention. The protocol established for the serial bus includes a sender address 302 (which may also be designated as a source address or sender field) and a receiver address 304 (which may also be denominated as a recipient address, destination address, or receiver field). These fields, 302 and 304, identify to whom the message is addressed and from what source. Messages may also include a data field 306, in which data may appear as packets or frames, for example. As noted, in an embodiment, messages may comprise a series of serially transmitted frames or fields, but messages may also be formulated and transmitted as packets.

The protocol governing operation of serial bus 110 may also contemplate additional fields not illustrated in FIG. 3. Additional message fields may include, for example, without limitation, bit synchronization frames that may be implemented as a "dotting" sequence (e.g., a series of 1-0 bit reversals), and a word synchronization frame, or sync word, signaling devices on the bus 110 to begin looking for valid data frames.

Although communication within a system described in an embodiment in accordance with the present invention may be defined to be limited to communication between control module 104 and server computers on the serial bus 110, such as server computers 112 and 122, there may be no proscription within a protocol or specification governing serial bus operation that would prevent an individual server computer 112, 122 from either transmitting a message to another server that does not host control module 104, or transmitting a message disguising itself as control module 104.

Figure 5:
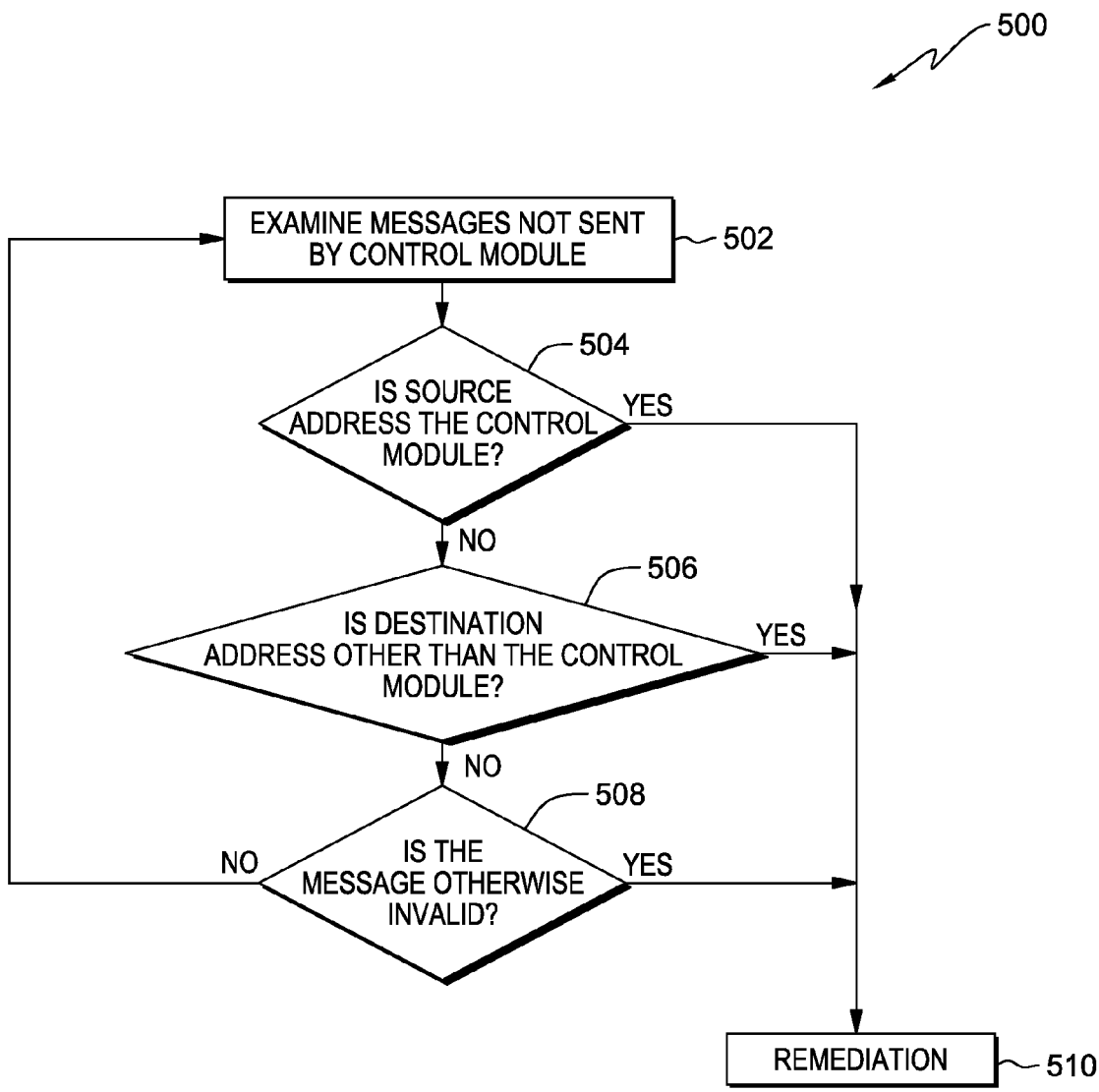
FIG. 5 is a flowchart illustrating detection of suspect messages on the serial bus in an embodiment in accordance with the present invention.

FIG. 5 is a flowchart, generally depicted by the numeral 500, illustrating detection of suspect messages on the serial bus in an embodiment in accordance with the present invention. Control module 104 scans all traffic on the serial bus 110. Control module 104 examines both the source address (sender address) and the receiver address (destination address) for each message transmitted over serial bus 110. As noted previously, by nature of the chassis protocol, all messages or packets should either be addressed to the control module 104 or sent by it. Messages having address fields that differ from that paradigm would be suspect and subject to some type of remediation. The control module 104 also has the capability to detect messages containing the control module's source address that nonetheless were not sent by control module 104. These are also designated as suspect packets.

Detection of such messages may be accomplished in several ways. One way is for control module 104 to maintain a deep message history for messages that control module 104 has actually originated. When control module 104 scans a message on serial bus 110 that contains the control module sender address, control module 104 merely needs to compare the message with the messages stored in message history to determine whether control module 104 actually sent it. If the message was actually transmitted by control module 104, control module 104 scans the next message on the serial bus until it finds a message that was not legitimately sent by control module 104 (Step 502). In various embodiments, control module 104 may maintain a number of event logs, including, for example, without limitation, history of valid messages transmitted by subordinate devices, history of suspect messages detected, and history of remedial actions taken. As a general proposition, the histories within these event logs would include copies of the messages themselves, along with time stamps for each occurrence.

If the source address of the scanned message is the address of control module 104 (Step 504; YES path), despite the fact that control module 104 has already determined that control module 104 did not originate the message, then some form of remediation is then set in motion (Step 510). Remediation activities are discussed in more detail subsequently in conjunction with FIG. 6.

If the source address of the scanned message is not the address of control module 104 (Step 504; NO path), the destination address of the message is examined in Step 506 to determine whether the destination address is other that the address of control module 104. If YES, then remediation (Step 510) is indicated. If NO, a determination is made as to whether the message is otherwise invalid (Step 508). If YES, then remediation (step 510) is once again indicated, and, if NO, examination of messages not sent by the control module continues in step 502.

A message may be invalid for several additional reasons. For example, a message may have an invalid source address or destination address (e.g., an address that has not been assigned to a device connected to the serial bus). Addresses for devices on the bus may be derived from the MAC (Media Access Control) address of a serial bus interface, such as serial bus interface 114 shown in FIG. 1. In the alternative, an address may be an IP (Internet Protocol) address associated with a serial bus interface, or an address may simply be a numeric value assigned to a serial bus interface at installation or configuration time. In any case, control module 104 maintains a record of valid addresses for devices that share serial bus 110. It is also possible for a message to be invalid because it contains undefined data, or because the message as a whole, or one or more of its fields or frames, fails a checksum, a CRC (cyclic redundancy check), or a parity check, or the message contains too many errors for error control coding, when implemented, to correct.

Figure 6:
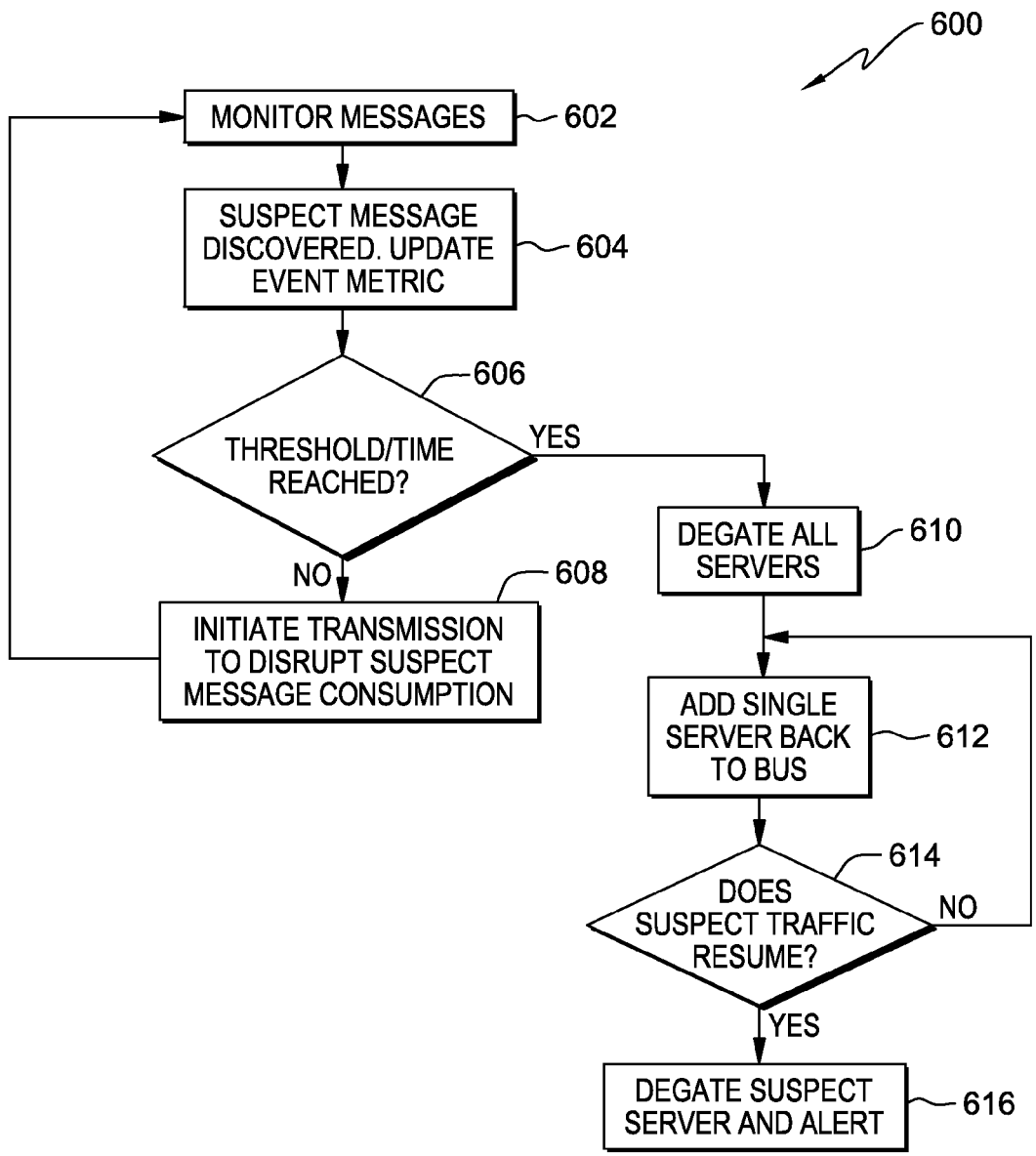
FIG. 6 is a flowchart illustrating remediation alternatives in an embodiment in accordance with the present invention.

FIG. 6 is a flowchart illustrating remediation alternatives in an embodiment in accordance with the present invention. Messages are continuously monitored in step 602. As discussed above in conjunction with FIG. 5, the control module 104 is well aware of messages or packets that it actually sent. When a suspect message is identified in step 604, an event metric is updated, and a threshold condition is tested in step 606.

The threshold condition may be expiration of a simple timer that aids in determining whether the suspect messages are being sent continuously, or whether the suspect message is merely a spurious occurrence that may have been caused by a logic error of some description, attributable to a soft failure, for example. In any event, detection of a threshold condition is generally driven by updating of an event metric, such as incrementing a counter or time period measurement. For example, part of step 604 for suspect message discovery may be testing an event log to determine if the recently detected suspect message matches another suspect message received only a short time before.

Figure 4:
FIG. 4 illustrates a sequence of data frames in an embodiment in accordance with the present invention.

If the threshold condition has not been satisfied (NO path), control module 104 attempts to disrupt the ongoing transaction in step 608, by initiating a co-transmission sufficient to disrupt consumption of the suspect message by a subordinate device. Depending upon the specific bus protocol, a simple sequence of data frames (402 in FIG. 4) may be sufficient to interfere with consumption of the suspect message. Since control module 104 knows the maximum message length for the protocol in use, a sequence of data frames 402 of a length at least equal to the maximum message length may be sufficient. In alternative embodiments, message disruption may be achieved by transmission of a single special data frame (or frames), that place subordinate devices on the bus into a known state, where the subordinate devices are no longer in a mode that permits message consumption. In any event, since bus 110 is shared and serial, control module 104 has the capability to intercept and disrupt the transaction in a timely fashion. After initiating the disruptive co-transmission in step 608, control module 104 returns to message monitoring in step 602.

If suspect message transmissions continue, control module 104 may effect a more permanent solution to this spoofing behavior. To accomplish this, when another suspect message is discovered (step 604), control module 104 once again updates an event metric and tests for a threshold condition. As noted above, the event metric update may be a simple increment to a counter or timer, but the evaluation and decision-making process may also involve storing suspect messages and comparing subsequent suspect messages to determine if the same message is being sent repeatedly. The decision in step 606 may also revolve around the rate at which any suspect messages are being detected. For example, if suspect messages are being detected at a rate of more than one suspect message per second, control module 104 may follow the YES branch from decision step 606 and degate all server computers off the bus in step 610. Of course, in various embodiments, other suspect message detection rates may apply.

Control module 104 then adds a single server computer back on to the bus in step 612. This step 612 signals the beginning of a reintegration period, during which control module 104 checks for resumption of suspect message traffic in step 614, follows the NO branch if no suspect traffic is detected, adds an additional server computer back to the bus in step 612, and tests for suspect traffic once again (step 614). As noted, during this reintegration period, control module 104 continues to monitor traffic on serial bus 110 after each server computer addition. If, after adding back a particular server computer in step 612, the suspect messages resume (step 614, YES branch), that particular server computer is degated and an alert is transmitted (step 616). The alert may be audible, visual, or a combination, and may also include an alert transmission to a system administrator.

These two types of remediation activity permit control module 104 to respond to two types of possible spoofing behavior. The first type of spoofing behavior occurs when a suspect server computer sends a series of transactions continuously to other server computers in the system. Because the actual source can be difficult to determine, control module 104 may degate all devices from serial bus 110 and add devices back singly until the culprit is identified. However, not all suspect traffic is transmitted continuously. In such a case, degating devices from the bus would do no good, since the suspect transmission would no longer be present when the culprit device is added back. In this instance, control module 104 can at least interfere with the current transmission. As discussed above with reference to FIG. 6, control module 104 may employ an event metric mechanism incorporating a threshold, such as a counter or timer that may be incremented and tested over short periods of time, to determine whether control module 104 should shift from interference remediation to full-scale degating remediation. When enough suspect messages arrive within an arbitrarily-defined period of time, for example, control module 104 may begin the process of degating and attempting to identify the spoofing entity.

In should be noted that various illustrative embodiments in accordance with the present invention interact with sender and/or recipient fields of a transmitted message. Since it is possible that sender and recipient fields may be specific to only some implementations, it is possible that a bad actor on the bus could simply neglect to send them. However, in that event, one or more of the embodiments in accordance with the present invention described herein may be modified to perform additional scanning to detect messages that do not conform to the protocol and disrupt them as well. This is accommodated by the validity check in the detection algorithm discussed in detail above.

Figure 7:
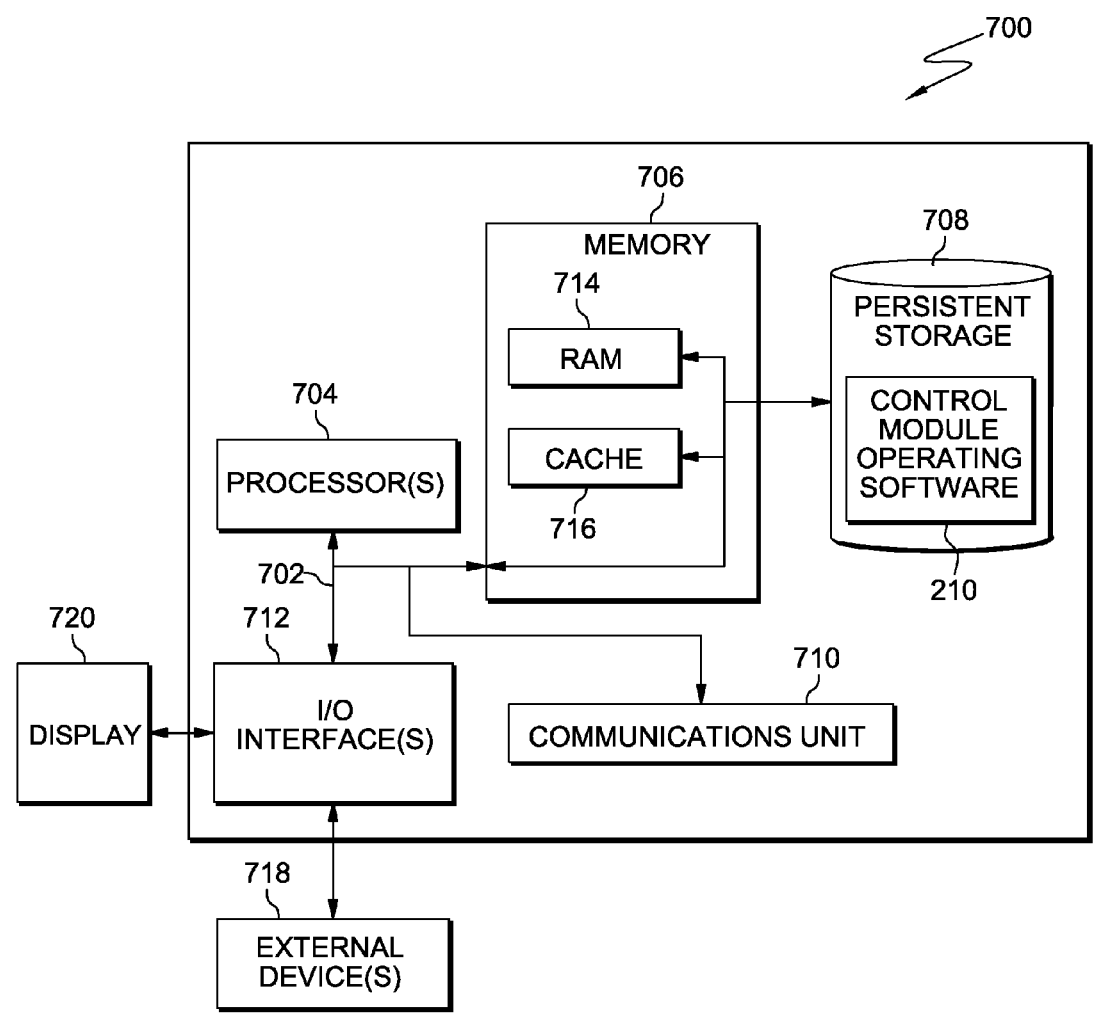
FIG. 7 is a functional block diagram of a computer system in an embodiment in accordance with the present invention.

FIG. 7 is a functional block diagram of a computer system in accordance with an embodiment of the present invention. FIG. 7 depicts computer system 700, which is representative of control module 104 that hosts control module operating software 210, data structures, or other resources in an illustrative embodiment in accordance with the present invention. It should be appreciated that FIG. 5 provides only an illustration of one implementation and does not imply any limitations with regard to the environments in which different embodiments may be implemented. Many modifications to the depicted environment may be made. As noted previously, the functions of control module 104 may be performed by a computer, such as a laptop or desktop, for example, without limitation, which would be representative of computer system 700.

Computer system 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are examples of computer readable tangible storage devices. A storage device is any piece of hardware that is capable of storing information, such as, data, program code in functional form, and/or other suitable information on a temporary basis and/or permanent basis. In this embodiment, memory 706 includes random access memory (RAM) 714 and cache memory 716. RAM 714 may be used to store data in various embodiments in accordance with the present invention. In general, memory 706 can include any suitable volatile or non-volatile computer readable storage device. Control module operating software 210, along with message histories and address listings, as discussed previously, may be stored in persistent storage 708 for access and/or execution by processors 704 via one or more memories of memory 706.

In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage devices capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other sub-systems or devices. In an embodiment, communications unit 710 may provide an appropriate interfaces to serial bus 110 or other suitable data communications network to connect to one or more additional devices. Communications unit 710 may also drive control signals 130 under control of processor(s) 704. In these examples, communications unit 710 may include one or more network interface cards. Communications unit 710 may provide communications through the use of either or both physical and wireless communications links. Software, such as control module operating software 210, and associated data, may be downloaded to persistent storage 708 through communications unit 710.

I/O interface(s) 712 allows for input and output of data with other devices that may be connected to computer system 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Control module operating software 210, and associated data, may be stored on such portable computer-readable storage media and can be loaded onto persistent storage 708 via I/O interface(s) 712. I/O interface(s) 712 also can connect to a display 720.

Display 720 provides a mechanism to display data to a user and may be, for example, a computer monitor. Display 720 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for securing a serial bus shared by a control module and one or more subordinate electronic devices, the serial bus having a protocol specifying that messages on the serial bus have a source address and a destination address, the method comprising:

examining, by one or more processors of the control module, each message appearing on the serial bus that was not originated by the control module;

identifying, by one or more processors of the control module, a suspect message that satisfies one or more suspect message criteria selected from the group consisting of:
  the source address of the message is the source address of the control module;
  the destination address of the message is an address other than the destination address of the control module; and
  the message includes one or more invalid fields;
updating, by one or more processors of the control module, an event metric, and testing to determine whether a threshold has been exceeded; and
in the event the threshold has not been exceeded, initiating, by one or more processors of the control module, a co-transmission sufficient to disrupt consumption of the suspect message by a subordinate device, wherein the co-transmission is selected from the group consisting of:
  a continuous sequence of data frames, wherein the sequence has a length at least substantially equal to maximum message length as defined by the serial bus protocol; and
  one or more data frames that place subordinate devices into a state, defined by the serial bus protocol, in which the subordinate devices are not immediately responsive to messages appearing on the serial bus.

2. The method in accordance with claim 1, further comprising:
  in the event the threshold has been exceeded, degating, by one or more processors of the control module, all subordinate devices off the serial bus;
  restoring, by one or more processors of the control module, the subordinate devices to the serial bus sequentially, one at a time;
  monitoring, by one or more processors of the control module, the serial bus for suspect messages after each subordinate device restoration; and
  if a suspect message is detected, degating, by one or more processors of the control module, the most recently restored subordinate device.

3. The method in accordance with claim 2, wherein degating, by one or more processors of the control module, all subordinate devices off the serial bus further comprises:
  asserting, by one or more processors of the control module, control signals that cause transmit data lines coupling each of the subordinate devices to the serial bus to be electrically isolated from the serial bus.

4. The method in accordance with claim 1, wherein examining, by one or more processors of the control module, each message appearing on the serial bus that was not originated by the control module further comprises:
  reading, by one or more processors of the control module, a message appearing on the serial bus;
  comparing, by one or more processors of the control module, the message to messages previously originated by the control module and stored in control module message history; and
  if the message does not appear in the message history, examining, by one or more processors of the control module, the message to determine whether the message is suspect.

5. The method in accordance with claim 1, wherein updating, by one or more processors of the control module, an event metric, and testing to determine whether a threshold has been exceeded further comprises:
  incrementing, by one or more processors of the control module, a counter value that counts a number of suspect message occurrences;
  evaluating, by one or more processors of the control module, time stamps associated with the suspect message and a prior suspect message to determine elapsed time; and
  comparing, by one or more processors of the control module, the counter value and the elapsed time with a predetermined threshold number of suspect message occurrences within a predetermined elapsed time.

6. A computer program product for securing a serial bus shared by a control module and one or more subordinate electronic devices, the serial bus having a protocol specifying that messages on the serial bus have a source address and a destination address, the computer program product comprising:
  one or more non-transitory computer readable storage media and program instructions stored on at least one of the one or more storage media, the program instructions comprising:
  program instructions to examine, by the control module, each message appearing on the serial bus that was not originated by the control module;
  program instructions to identify, by the control module, a suspect message that satisfies one or more suspect message criteria selected from the group consisting of:
    the source address of the message is the source address of the control module;
    the destination address of the message is an address other than the destination address of the control module; and
    the message includes one or more invalid fields;
  program instructions to update, by the control module, an event metric, and test to determine whether a threshold has been exceeded; and
  in the event the threshold has not been exceeded, program instructions to initiate, by the control module, a co-transmission sufficient to disrupt consumption of the suspect message by a subordinate device, wherein the co-transmission is selected from the group consisting of:
    a continuous sequence of data frames, wherein the sequence has a length at least substantially equal to maximum message length as defined by the serial bus protocol; and
    one or more data frames that place subordinate devices into a state, defined by the serial bus protocol, in which the subordinate devices are not immediately responsive to messages appearing on the serial bus.

7. The computer program product of claim 6, further comprising:
  in the event the threshold has been exceeded, program instructions to degate, by the control module, all subordinate devices off the serial bus;
  program instructions to restore, by the control module, the subordinate devices to the serial bus sequentially, one at a time;
  program instructions to monitor, by the control module, the serial bus for suspect messages after each subordinate device restoration; and
  if a suspect message is detected, program instructions to degate, by the control module, the most recently restored subordinate device.

8. The computer program product of claim 7, wherein program instructions to degate, by the control module, all subordinate devices off the serial bus further comprises:

program instructions to assert, by the control module, control signals that cause transmit data lines coupling each of the subordinate devices to the serial bus to be electrically isolated from the serial bus.

9. The computer program product of claim 6, wherein program instructions to examine, by the control module, each message appearing on the serial bus that was not originated by the control module further comprises:
program instructions to read, by the control module, a message appearing on the serial bus;
program instructions to compare, by the control module, the message to messages previously originated by the control module and stored in control module message history; and
if the message does not appear in the message history, program instructions to examine, by the control module, the message to determine whether the message is suspect.

10. The computer program product of claim 6, wherein program instructions to update, by the control module, an event metric, and test to determine whether a threshold has been exceeded further comprises:
program instructions to increment, by the control module, a counter value that counts number of suspect message occurrences;
program instructions to evaluate, by the control module, time stamps associated with the suspect message and a prior suspect message to determine elapsed time; and
program instructions to compare, by the control module, the counter value and the elapsed time with a predetermined threshold of number of suspect message occurrences within a predetermined elapsed time.

11. A computer system for securing a serial bus shared by a control module and one or more subordinate electronic devices, the serial bus having a protocol specifying that messages on the serial bus have a source address and a destination address, the computer system comprising:
one or more computer processors;
one or more non-transitory computer readable storage media; and
program instructions stored on the non-transitory computer readable storage media for execution by at least one of the one or more computer processors, the program instructions comprising:
program instructions to examine, by the control module, each message appearing on the serial bus that was not originated by the control module;
program instructions to identify, by the control module, a suspect message that satisfies one or more suspect message criteria selected from the group consisting of:
the source address of the message is the source address of the control module;
the destination address of the message is an address other than the destination address of the control module; and
the message includes one or more invalid fields;
program instructions to update, by the control module, an event metric, and test to determine whether a threshold has been exceeded; and
in the event the threshold has not been exceeded, program instructions to initiate, by the control module, a co-transmission sufficient to disrupt consumption of the suspect message by a subordinate device, wherein the co-transmission is selected from the group consisting of:
a continuous sequence of data frames, wherein the sequence has a length at least substantially equal to maximum message length as defined by the serial bus protocol; and
one or more data frames that place subordinate devices into a state, defined by the serial bus protocol, in which the subordinate devices are not immediately responsive to messages appearing on the serial bus.

12. The computer system of claim 11, further comprising:
in the event the threshold has been exceeded, program instructions to degate, by the control module, all subordinate devices off the serial bus;
program instructions to restore, by the control module, the subordinate devices to the serial bus sequentially, one at a time;
program instructions to monitor, by the control module, the serial bus for suspect messages after each subordinate device restoration;
if a suspect message is detected, program instructions to degate, by the control module, the most recently restored subordinate device; and
program instructions to transmit, by the control module, an alert.

13. The computer system of claim 11, wherein program instructions to examine, by the control module, each message appearing on the serial bus that was not originated by the control module further comprises:
program instructions to read, by the control module, a message appearing on the serial bus;
program instructions to compare, by the control module, the message to messages previously originated by the control module and stored in control module message history; and
if the message does not appear in the message history, program instructions to examine, by the control module, the message to determine whether the message is suspect.

14. The computer system of claim 11, wherein program instructions to update, by the control module, an event metric, and test to determine whether a threshold has been exceeded further comprises:
program instructions to increment, by the control module, a counter value that counts number of suspect message occurrences;
program instructions to evaluate, by the control module, time stamps associated with the suspect message and a prior suspect message to determine elapsed time; and
program instructions to compare, by the control module, the counter value and the elapsed time with a predetermined threshold of number of suspect message occurrences within a predetermined elapsed time.

* * * * *